US009009048B2

(12) United States Patent
Jang et al.

(10) Patent No.: US 9,009,048 B2
(45) Date of Patent: Apr. 14, 2015

(54) METHOD, MEDIUM, AND SYSTEM DETECTING SPEECH USING ENERGY LEVELS OF SPEECH FRAMES

(75) Inventors: Giljin Jang, Suwon-si (KR); Jeongsu Kim, Yongin-si (KR); John S. Bridle, Cheltenham (GB); Melvyn J. Hunt, Cheltenham (GB)

(73) Assignees: Samsung Electronics Co., Ltd., Suwon-Si (KR); Apple Inc., Cupertino, CA (US)

( * ) Notice: Subject to any disclaimer, the term of this patent is extended or adjusted under 35 U.S.C. 154(b) by 1570 days.

(21) Appl. No.: 11/882,444

(22) Filed: Aug. 1, 2007

(65) Prior Publication Data

US 2008/0033723 A1 Feb. 7, 2008

(30) Foreign Application Priority Data

Aug. 3, 2006 (KR) .................. 10-2006-0073386

(51) Int. Cl.
*G10L 15/04* (2013.01)
*G10L 15/02* (2006.01)
*G10L 15/00* (2013.01)
*G10L 21/00* (2013.01)
*G10L 25/78* (2013.01)

(52) U.S. Cl.
CPC .............. *G10L 25/78* (2013.01); *G10L 15/04* (2013.01)

(58) Field of Classification Search
USPC ............. 704/200–201, 211–218, 226–257, 704/E17.001–E17.016, E15.001–E15.05
See application file for complete search history.

(56) References Cited

U.S. PATENT DOCUMENTS

| 4,713,777 | A |   | 12/1987 | Klovstad et al. | |
|---|---|---|---|---|---|
| 4,780,906 | A | * | 10/1988 | Rajasekaran et al. | 704/251 |
| 4,979,214 | A | * | 12/1990 | Hamilton | 704/233 |
| 5,133,012 | A | * | 7/1992 | Nitta | 704/251 |
| 5,197,113 | A | * | 3/1993 | Mumolo | 704/200 |
| 5,319,736 | A | * | 6/1994 | Hunt | 704/227 |
| 5,390,278 | A | * | 2/1995 | Gupta et al. | 704/243 |
| 5,414,796 | A | * | 5/1995 | Jacobs et al. | 704/221 |
| 5,566,270 | A |   | 10/1996 | Albesano et al. | |
| 5,659,622 | A | * | 8/1997 | Ashley | 381/94.1 |
| 5,679,001 | A | * | 10/1997 | Russell et al. | 434/185 |
| 5,819,217 | A | * | 10/1998 | Raman | 704/233 |
| 5,848,387 | A | * | 12/1998 | Nishiguchi et al. | 704/214 |
| 5,960,395 | A |   | 9/1999 | Tzirkel-Hancock | |
| 6,029,130 | A | * | 2/2000 | Ariyoshi | 704/248 |
| 6,067,517 | A |   | 5/2000 | Bahl et al. | |
| 6,175,634 | B1 | * | 1/2001 | Graumann | 381/94.1 |
| 6,195,634 | B1 | * | 2/2001 | Dudemaine et al. | 704/231 |
| 6,260,017 | B1 | * | 7/2001 | Das et al. | 704/265 |
| 6,304,842 | B1 | * | 10/2001 | Husain et al. | 704/214 |
| 6,560,575 | B1 |   | 5/2003 | Keiller | |

(Continued)

FOREIGN PATENT DOCUMENTS

| JP | 09-265300 | 10/1997 |
|---|---|---|
| JP | 2000-148178 | 5/2000 |

(Continued)

*Primary Examiner* — Pierre-Louis Desir
*Assistant Examiner* — David Kovacek
(74) *Attorney, Agent, or Firm* — Staas & Halsey LLP (57) ABSTRACT

A speech recognition method, medium, and system. The method includes detecting an energy change of each frame making up signals including speech and non-speech signals, and identifying a speech segment corresponding to frames that include only speech signals from among the frames based on the detected energy change.

20 Claims, 6 Drawing Sheets

(56) References Cited

U.S. PATENT DOCUMENTS

| | | | |
|---|---|---|---|
| 7,062,434 B2 * | 6/2006 | Zinser et al. | 704/233 |
| 7,243,062 B2 * | 7/2007 | Wark | 704/214 |
| 7,337,108 B2 * | 2/2008 | Florencio et al. | 704/208 |
| 7,356,748 B2 * | 4/2008 | Taleb | 714/746 |
| 2002/0007270 A1 | 1/2002 | Murashima | |
| 2003/0045953 A1 * | 3/2003 | Weare | 700/94 |
| 2003/0086341 A1 * | 5/2003 | Wells et al. | 369/13.56 |
| 2003/0231775 A1 * | 12/2003 | Wark | 381/56 |
| 2004/0158465 A1 * | 8/2004 | Rees | 704/233 |
| 2005/0273334 A1 | 12/2005 | Schleifer et al. | |
| 2006/0062379 A1 | 3/2006 | Sedarat et al. | |
| 2006/0200344 A1 * | 9/2006 | Kosek et al. | 704/226 |
| 2007/0185711 A1 * | 8/2007 | Jang et al. | 704/226 |
| 2008/0027711 A1 * | 1/2008 | Rajendran et al. | 704/201 |
| 2008/0033723 A1 * | 2/2008 | Jang et al. | 704/254 |

FOREIGN PATENT DOCUMENTS

| | | |
|---|---|---|
| JP | 2001-350488 | 12/2001 |
| KR | 1997-67095 | 10/1997 |
| KR | 10-2000-0056849 | 9/2000 |

* cited by examiner

METHOD, MEDIUM, AND SYSTEM DETECTING SPEECH USING ENERGY LEVELS OF SPEECH FRAMES

CROSS-REFERENCE TO RELATED APPLICATIONS

This application claims the benefit of Korean Patent Application No. 10-2006-0073386, filed on Aug. 3, 2006, in the Korean Intellectual Property Office, the disclosure of which is incorporated herein in its entirety by reference.

BACKGROUND OF THE INVENTION

1. Field of the Invention

One or more embodiments of the present invention relate to a speech recognition technique, and more particularly, to a speech detection method, medium, and system.

2. Description of the Related Art

Speech recognition techniques implement computers to analyze, identify, and recognize human speech. In such speech recognition techniques, spoken speech signals are converted into electrical signals, and pronunciation is recognized by extracting frequency characteristics of the speech signals by using human speech having a specific frequency caused by changes in mouth shape and tongue location depending on phonation.

Recently, such aforementioned speech recognition techniques have been applied to various fields such as telephone dialing, toy control, language learning, and household appliance control, for example.

Figure 1:
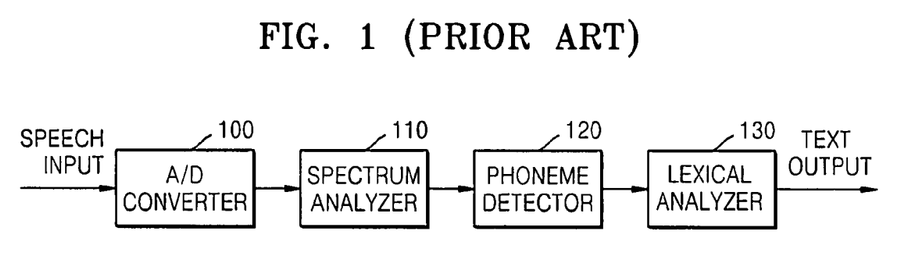
FIG. 1 illustrates a conventional speech recognition device based on phoneme recognition.

FIG. 1 illustrates a conventional speech recognition device based on phoneme recognition.

Referring to FIG. 1, the speech recognition device includes an A/D converter 100, spectrum analyzer 110, a phoneme detector 120, and a lexical analyzer 130.

The A/D converter 100 converts an analog speech signal transmitted through a microphone into a digital signal input to the spectrum analyzer 110. Frequency spectrum characteristics of the digital signal are then analyzed. Only acoustic features are extracted and supplied to the phoneme detector 120, and the phoneme detector 120 outputs a predetermined sequence of the phonemes obtained from the input speech signal. Thereafter, the lexical analyzer 130 receives the phoneme sequence and finally recognizes words or sentences.

However, since the speech recognition device analyzes the frequency characteristics of the input speech signal and compares the frequency characteristics with an acoustic model stored in the phoneme detector 120 in order to detect the phoneme, the effects of noises accompanying the speech signal are not taken into consideration. Accordingly, performance of the speech recognition device is deteriorated due to such noise, since the noise can typically be improperly recognized as phonemes or improperly influence the phoneme recognition.

In this regard, known techniques for improving the performance of speech recognition devices have included noise models considering the inclusion of noise in the input speech, such a technique is discussed in US Patent Publication No. 2004/0158465, titled "SPEECH PROCESSING APPARATUS AND METHOD" which discusses a noise masking technique for removing noise from frames of input speech signals by using a filter.

However, since such existing techniques including noise masking techniques are optimized for stationary noises, whose characteristics do not temporally change substantially, e.g., noise generated from cars or turbines of an airplane having frequency characteristics that do not temporally change substantially, while a burst noise generated in short time bursts, e.g., a small breathing sound, a mechanical frictional sound, and a mouth sound generated in the front or back end of the input speech signal, represent noises that are very difficult to distinguish between speech and non-speech sounds.

In addition, in speech recognition techniques based on such conventional phoneme recognition devices, frequently, a non-speech signal including such a burst noise generated in the front or back end of the aforementioned input phoneme is incorrectly recognized as an actual phoneme, which results in deterioration of the performance of the speech recognition device.

SUMMARY OF THE INVENTION

One or more embodiments of the present invention provide a speech segment detection method, medium, and system for accurately detecting speech segments from an input speech including a burst noise by using a dynamic programming algorithm so as to not recognize burst noise as actual speech.

One or more embodiments of the present invention further provide a speech recognition method, medium, and system capable of accurately recognizing input speech by recognizing the speech based on a detection result of speech segments for accurately detecting speech segments from an input speech including a burst noise by using a dynamic programming algorithm so as to not recognize burst noise as actual speech.

Additional aspects and/or advantages of the invention will be set forth in part in the description which follows and, in part, will be apparent from the description, or may be learned by practice of the invention.

To achieve the above and/or other aspects and advantages, embodiments of the present invention include a speech recognition method, including detecting energy changes between a plurality of frames distinguishing portions of a signal, each of the plurality of frames having time lengths less than a whole time length of the signal, and identifying speech segments and/or non-speech segments from the plurality of frames based on the detected energy changes between the plurality of frames.

To achieve the above and/or other aspects and advantages, embodiments of the present invention include at least one medium including computer readable code to control at least one processing element to implement an embodiment of the present invention.

To achieve the above and/or other aspects and advantages, embodiments of the present invention include a speech recognition method, including calculating an energy for each frame, of a plurality of frames making up a signal including speech and/or non-speech segments, the plurality of frames distinguishing portions of the signal, and each of the plurality of frames having time lengths less than a whole time length of the signal, classifying each frame according to corresponding calculated energies of respective frames, identifying a segment in which an energy of frames within the segment changes based on the classified energy level, and assigning a predetermined weight to the segment and identifying a speech segment as a segment in which an assigned weight is minimized compared to weights of other segments.

To achieve the above and/or other aspects and advantages, embodiments of the present invention include a speech recognition system, including a change detector to detect energy changes between a plurality of frames distinguishing portions of a signal, each of the plurality of frames having lengths less than a whole time length of the signal, and a determiner to identify speech segments and/or non-speech segments from the plurality of frames based on the detected energy changes between the plurality of frames.

To achieve the above and/or other aspects and advantages, embodiments of the present invention include a speech recognition system, including an A/D converter to convert an analog input signal including speech and/or non-speech signals transmitted through an audio transducer into a digital input signal, a frame generator to generate a plurality of frames corresponding to the digital input signal, a phoneme detector to generate a phoneme sequence from the frames, a vocabulary recognition device to extract a phoneme sequence most similar to the phoneme detector generated phoneme sequence from a dictionary that stores reference phoneme sequences, a speech segment detection device including a determiner to detect energy changes between the frames distinguishing portions of the signal, each of the frames having time lengths less than a whole time length of the signal, and to identify a speech segment from the frames based on the detected energy changes between the frames, and a phoneme sequence editor to edit the phoneme detector generated phoneme sequence based on information on speech segments provided from the speech segment detection device.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2:
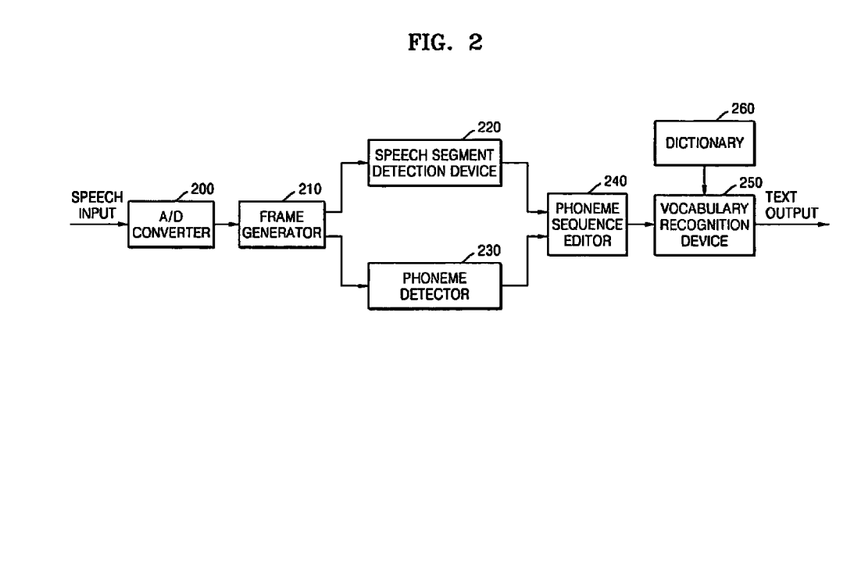
FIG. 2 illustrates a speech recognition system, according to an embodiment of the present invention.

FIG. 2 illustrates a speech recognition system, according to an embodiment of the present invention.

Referring to FIG. 2, the speech recognition system may include an A/D converter 200, a frame generator 210, a speech segment detection device 220, a phoneme detector 230, a phoneme sequence editor 240, a vocabulary recognition device 250, and a dictionary 260, for example.

The A/D converter 200 may be used to convert an analog speech signal (including noises), e.g., as transmitted through a microphone, into a digital signal. The frame generator 210 may then generate frames, as short segments of predetermined length, from the input signal. The generated frames may then be supplied to the speech segment detection device 220 and the phoneme detector 230, respectively. The speech segment detection device 220 calculates energies of the input frames, classifies the frames according to the calculated energies, and identifies actual speech segments, which may be of un-identified length, by using a dynamic programming algorithm, for example. The phoneme detector 230 may detect a phoneme as a minimal unit of speech from the input frame(s) based of a predetermined acoustic model. Information on the speech segment, provided by the speech segment detection device 220, and information on the phoneme sequence, provided by the phoneme detector 230, may thus be supplied to the phoneme sequence editor 240.

Here, the phoneme sequence editor 240 extends speech segments, identified by the speech segment detection device 220, as including a phoneme sequence that is firstly laid over a border. Next, all phoneme sequences not included in the extended speech segment are removed, silence segments with suitable lengths are added to front and back portions, and neighboring silence segments are integrated.

Figure 5:
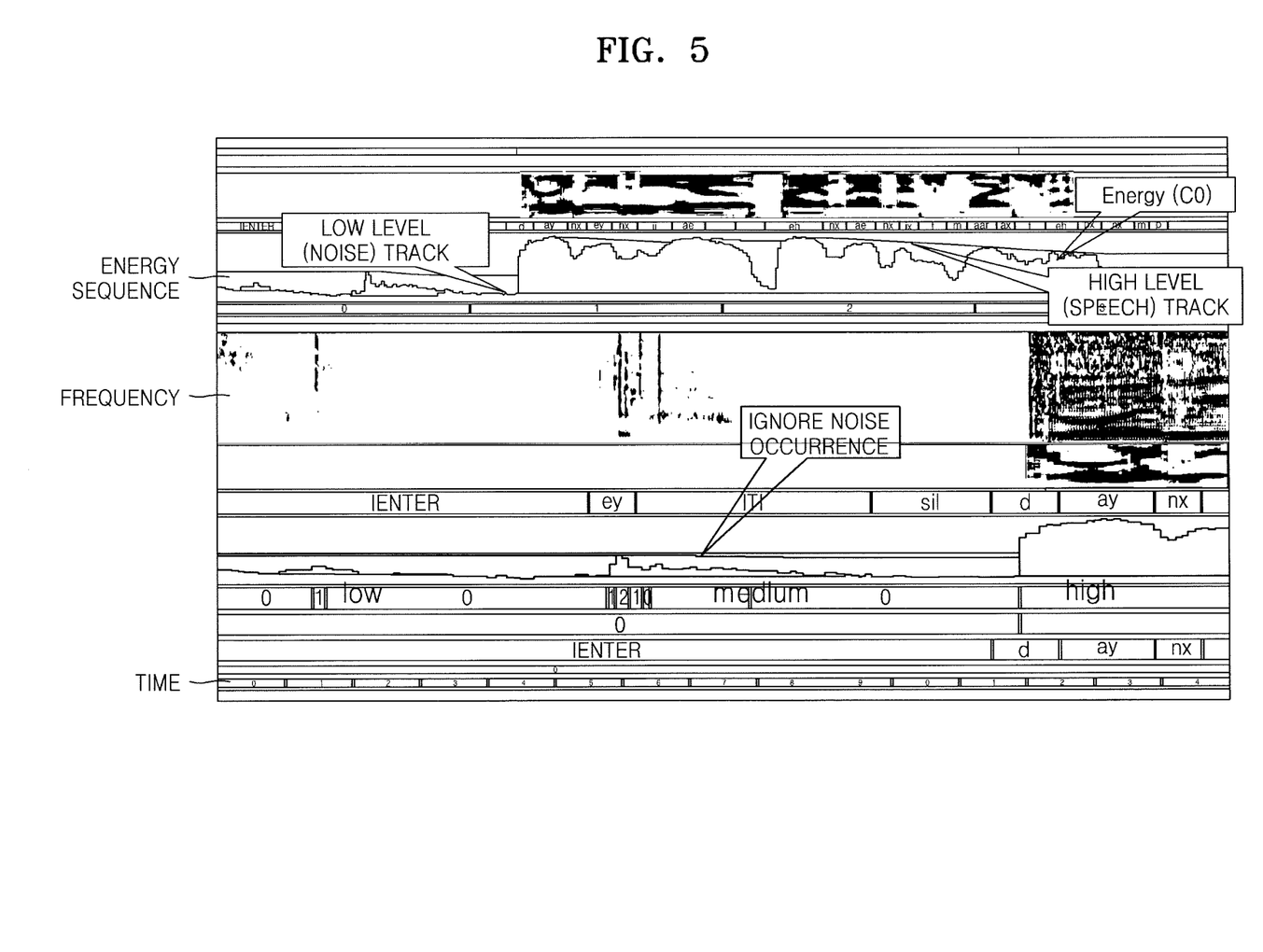
FIG. 5 graphically illustrates a result of speech segment detection using a speech segment detection method, according to an embodiment of the present invention.

Referring to FIG. 5, such an extended segment includes all the illustrated "d" (speech) segments and some illustrated "sil" (silence) segments. Accordingly, the "sil's" are maintained. Here, an initial "sil" segment is marked as the illustrated "!ENTER". The occurrence of an incorrect phoneme recognition, caused by noise, can be removed by the phoneme sequence editor 240, and then, a clean phoneme sequence can be input to the vocabulary recognition device 250, for example. The vocabulary recognition device 250 may extract vocabulary corresponding to the phoneme sequence, e.g., from the dictionary 260 as a database for storing information on the phoneme sequences and vocabularies, analyze the extracted vocabulary, and potentially generate text corresponding to the phoneme sequence so as to supply the text to an output unit (not shown), for example.

Figure 3:
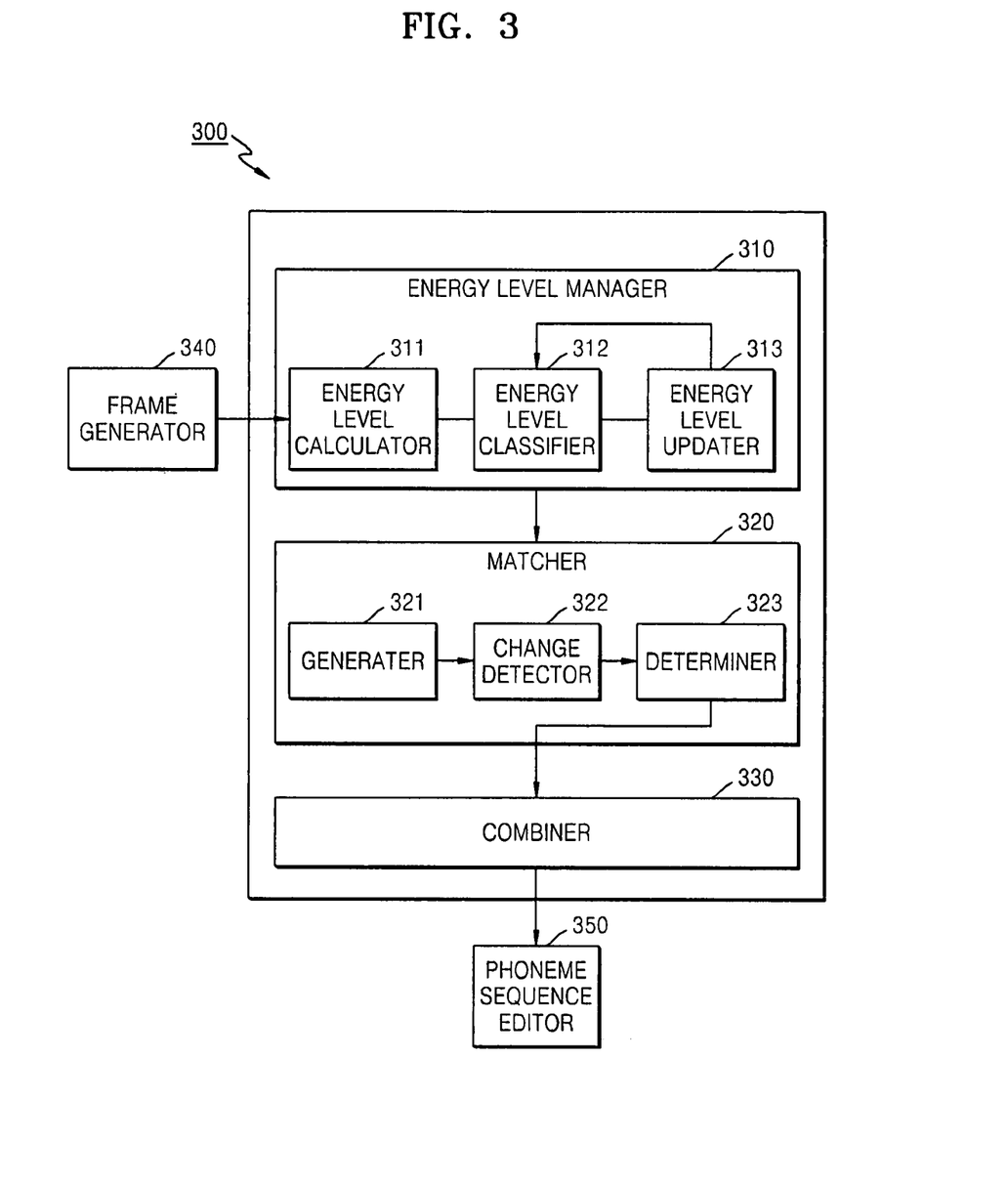
FIG. 3 illustrates a speech segment detection system, such as that shown in FIG. 2, according to an embodiment of the present invention.

FIG. 3 illustrates a speech segment detection system, such as the speech segment detection device of FIG. 2, according to an embodiment of the present invention.

Referring to FIG. 3, the speech segment detection system 300 may include an energy level manager 310, a matcher 320, and a combiner 330, for example.

The energy level manager 310 may receive a plurality of frames from a frame generator, for example, that generates frames having a predetermined size, also as an example, from a speech signal (hereinafter, referred to as an input signal) potentially including noise. Here, the frame is used to represent a short speech segment, as an example, though short speech segments may be made up of several frames depending on the length of each frame. The energy level manager 310, thus, calculates energies of the plurality of frames and generates a sequence including high (speech) energy levels and low (non-speech) energy levels. In addition, the frames may be classified according to the calculated energy levels.

The energy level manager 310 may include an energy level calculator 311, an energy level classifier 312, and an energy level updater 313, for example. The energy level calculator 311 may calculate the energy of each frame, with the frame energy indicating the energy of each frame. Generally, human speech has a high energy characteristic, and non-speech representing potential noise has a low energy characteristic. However, a reviewed segment in which the energy sharply increases within a short time, for example, a burst noise having a frequency characteristic that remarkably changes over a short time, among additional non-speech signals having low energy characteristics, may be defined as representing a high energy characteristic noise. Accordingly, an aspect of an embodiment of the present invention is to exclude the possibility of recognizing the non-speech having the aforementioned high energy characteristic noise as human speech. Here, the energy of the frame constructed by signals including speech and non-speech signals can be calculated by using an energy calculation method that is generally used in speech recognition techniques. The energy level calculator 311 may then supply the calculated energies of the plurality of frames to the energy level classifier 312. The energy level classifier 312 may then classify the frames into three energy levels including a high level 2, a medium level 1, and a low level 0, for example, according to their respective energy levels. The energy level updater 313 may, thus, update criteria for setting such high, medium, and low levels, according to the energy of the input signal. Specifically, the information on the energy level of the current input frame may be fed to the energy level classifier 212 in order to apply new criteria to subsequent input frames, thereby classifying the frames into the high, medium, and low levels. Non-speech having relatively high energy and speech having relatively low energy are more accurately distinguished from each other by enabling the energy value of the input signal to be reflected in the classification criteria.

The matcher 320 may then receive the frames from the energy level manager 310 and identify speech segments of the input signal by using a dynamic programming algorithm based on the classified energy levels. In general, the dynamic programming algorithm may have a methodology in which a given problem is divided into several sub-problems and the sub-problems are circularly performed to approach the final solution. When the aforementioned concept is applied to an embodiment of the present invention, in a sequence of a plurality of frame energies including the speech that is to be finally obtained and the non-speech, short energy anomalies are ignored, and a segment in which real speech begins can be identified. Accordingly, it is determined whether each frame is a speech segment or non-speech segment by calculating variables that are frames and their energy levels and classifying frames according to the variables. The initial speech segment may be detected based on the determination of whether each frame is a speech segment or non-speech segment.

In processes of the dynamic programming algorithm, according to an embodiment of the present invention, all paths to which the current path may be changed may be generated. Here, the path indicates the change of the energy level of each frame of the input signal. Accordingly, in an embodiment, a penalty may be assigned to a change of the frame energy level in each path, and a penalty may be assigned to the case where the energy level is changed from that of the original input. Then, a segment of the input signal in which a sum of the total penalties is minimized can be selected and identified as a local speech segment. Here, a local segment indicates a segment, e.g., with a predetermined range, obtained by applying the dynamic programming algorithm. Accordingly, the local speech segment obtained through the aforementioned processes may be obtained by dividing the frame segment of the entire input signal into predetermined segments and determining whether the segments are speech segments or non-speech segments by applying the dynamic programming.

An example implementation of the algorithm of the dynamic programming will be described with reference to FIG. 6.

First, illustrated frame numerals 1 to 14 on the transverse axis represent frame numbers, with the longitudinal axis representing the energy levels of the input signal classified into a low level 0, a medium level 1, and a high level 2, for example.

Here, the illustrated solid line arrow represents a penalty assigned to a speech/non-speech change, and a dotted line arrow represents a penalty assigned to a change from an original path. A large circle represents an initially measured energy level, that is, an initially measured energy level of an input, with a small circle representing a detected speech/non-speech segment path (as output) in which a penalty, e.g., detected by the dynamic programming, is at a minimum.

In a segment 600, from frame number 2 to frame number 6, the energy level is changed from the low level to the medium level between second and third frames, from the medium level to the high level between third and fourth frames, from the high level to the medium level between fourth and fifth frames, and from the medium level to the low level between fifth and sixth frames. Though four penalties are assigned to the five frames, the number of penalties is reduced to three by enabling the energy levels of the third to fifth frames to be low level.

Similarly, in a segment 610, from frame number 10 to frame 14, the energy level is changed from the low level to the high level between tenth and eleventh frames and is not changed from the high level 2 in the eleventh through fourteenth frames. Finally, since only one penalty is assigned to the five frames, the aforementioned case is advantageous in terms of a cost function, for example. Here, such a cost function can be used to indicate time complexity in programming, that is, a time period for obtaining a solution by way of various paths. According to an embodiment of the present invention, a cost function may be determined by (the number of frames)×(energy level 0, 1, or 2). This is advantageous for performing the dynamic programming algorithm. When the energy levels include two levels 0 and 1, the cost function is reduced, but accuracy of detecting speech and non-speech decreases. When the energy levels include three levels or more, 0, 1, 2, 3, or more, the accuracy increases, but the extent of the cost function is increased. That is, efficiency decreases. Accordingly, classification into three levels including a high level 2, a medium level 1, and a low level 0 may be used in an optimal embodiment. However, it should be understood by those of ordinary skill in the art that such a three-level classification is only one embodiment of the present invention and embodiments of the present invention are not limited thereto, thus, alternative classifications, e.g., into three levels or more or classification into three levels or less, are also available in the present invention.

Figure 6:
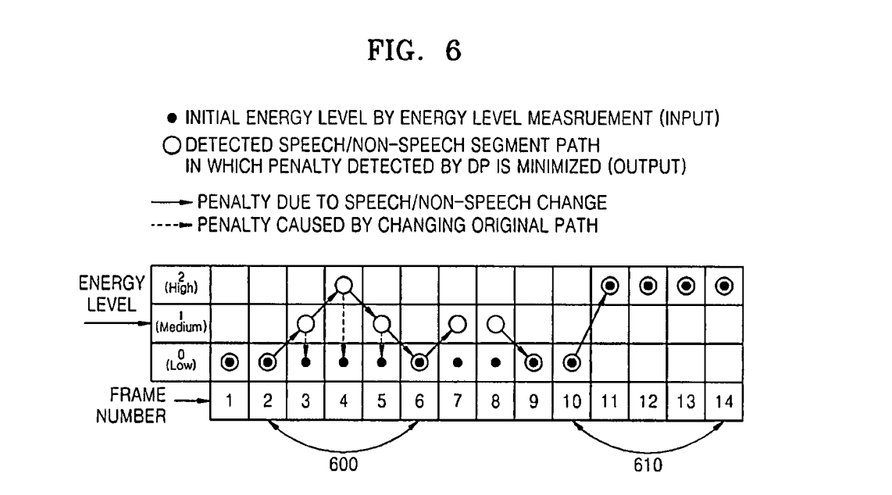
FIG. 6 illustrates an operation of a dynamic programming algorithm, according to an embodiment of the present invention.

A result of the aforementioned processes represented by reference numerals 600 and 610 of FIG. 6 may be obtained by using the aforementioned dynamic programming algorithm for selecting a path in which a sum of penalties is minimized. In brief, a dynamic programming algorithm, according to an embodiment of the present invention, may be used for obtaining an optimal solution by finding a path which has a cost function that is minimized among possible paths.

Referring to FIG. 3, again, the matcher 320 may assign a suitable penalty to a part of each frame where the energy level changes. Here, the penalty indicates the weight that is assigned for performing the dynamic programming algorithm. The aforementioned procedures may be repeated in each predetermined segment by changing the energy level of the frame. Sequentially, for example, a speech/non-speech change in which a sum of total penalties of a predetermined number of frames is minimized can be obtained.

The matcher 320 may include a generator 321, a change detector 322, and a determiner 323, for example. In order to start the dynamic programming algorithm, the generator 321 may generate an energy level for each frame by changing the energy level of each frame to a possible energy level, that is, the energy level of each frame may be generated by changing the energy level of each frame to one of the three energy levels 0 to 2, for example. The change detector 322 may then detect a segment in which the energy level of the current input signal has changed between neighboring frames, for example, the segment in which the energy level is changed between the first and second frames. In addition, a segment in which the generated energy level has changed from the energy level of the frame of the initial input signal can be detected. The determiner may, thus, assign a penalty to a segment detected by the change detector 322. Here, the segment to which the penalty is assigned is a segment in which the energy level has changed between neighboring frames or a segment in which the energy level of the frame has been changed by the generator 321. The penalty may be calculated by repeatedly performing the aforementioned procedures with respect to all the segments of the input signal, a segment of which having total penalties that are minimized may be identified as a speech segment. Here, the speech segment, thus, more confidently represents a segment including only speech frames among speech and non-speech frames.

Thereafter, the combiner may combine the speech segment identified by the matcher 320 with the speech segments of the entire input signal.

Figure 4:
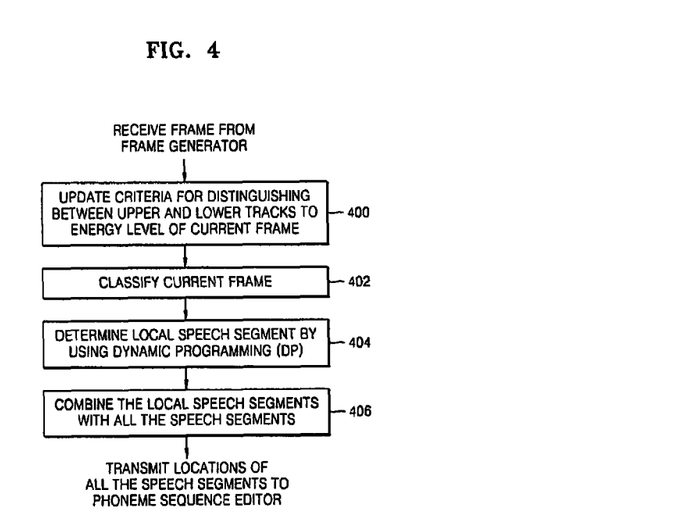
FIG. 4 illustrates a speech segment detection method, according to an embodiment of the present invention.

FIG. 4 illustrates a speech segment detection method, according to an embodiment of the present invention.

Referring to FIG. 4, the speech segment detection device may receive frames from a frame generator, e.g., with the frame generator generating predetermined sized frames from an input signal. Here, the frame may be constructed by a small scaled input signal sequence. In operation 400, criteria for distinguishing between speech and non-speech segments may be updated, e.g., by the aforementioned energy level updater 313, specifically, between an upper level track representing a speech segment and a lower level track representing a non-speech segment. The criteria for classifying the frames into high, medium, and low levels may not be previously determined but may be determined according to the energy of the input signal. In operation 402, the frames may be classified according to the energy levels of the current frames based of the updated upper and lower level tracks, e.g., by the energy level classifier 312. In operation 404, local speech segments may be determined based on the energy level classified by using the dynamic programming algorithm, e.g., by the matcher 320. Here, in the dynamic programming algorithm, according to an embodiment, a penalty is assigned to a segment in which a speech/non-speech change occurs, based on the energy level of each frame, and speech/non-speech segments may be identified as when the total penalties are minimized. In operation 406, the local speech segments, e.g., detected in operation 404, may be combined with all speech segments, e.g., by the combiner 330. Subsequently, location information of all speech segments may be provided to an phoneme sequence editor, for example.

As noted above, FIG. 5 illustrates an example result of a detecting of speech segments using a speech segment detection system, according to another embodiment of the present invention.

For example, according to an embodiment, input speech of "Joining You by Alanis Morisette" may be input in a form of "<title of a song> by <singer>".

Referring to the illustration of FIG. 5, the upper portion of FIG. 5 illustrates the measured energy of the input signal and represents the high energy variation (speech energy) and the low energy variation (background noise). Frequency changes of the input signal are shown in the middle portion of FIG. 5, with the two lowest lines of FIG. 5 illustrating a phoneme sequence output from a phoneme detector, for example, and a phoneme sequence cleaned up according to an embodiment of the present invention, respectively. Energies of the frames are marked as high 2, medium 1, and low 0, and short frames marked as 1 or 2 are ignored, e.g., by the speech segment detection device, according to an embodiment of the present invention. As a result, in the illustrated example results, the identified actual speech input starts from 1.18 seconds, i.e., the [d] segment.

A speech segment detection method, medium, and system, according to an embodiment of the present invention, can effectively detect a speech segment by discriminating between spurious phoneme sequences such as burst noise, generated over short times, small breathing sounds, mechanical frictional sounds, and mouth sounds, generated in the front or back end of the input speech, and real user's speech.

In addition, the speech segment detection method, medium, and system, according to an embodiment of the present invention, can be simply embodied by analyzing only the energy of the input signal.

In addition, it is possible to avoid incorrect speech recognition of phoneme sequences, which frequently occurs in speech recognition devices that largely depends on phoneme recognition results, by using a speech recognition system according to an embodiment of the present invention.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A speech recognition method, comprising:
   detecting, using at least one processing device, energy changes between a plurality of frames distinguishing portions of a signal, each of the plurality of frames having time lengths less than a whole time length of the signal; and
   identifying speech segments and/or non-speech segments from the plurality of frames based on the detected energy changes between the plurality of frames by assigning a predetermined weight to a segment in which an energy level of a respective frame is changed and when an energy difference exists between two neighboring frames.

2. The method of claim 1, further comprising classifying each of the plurality of frames according to respective energy levels based on predetermined criteria,
   wherein in the detecting of the energy changes between the plurality of frames, detection of the energy change is based on differences in the respective classified energy levels.

3. The method of claim 2, wherein the identifying of the speech segment and/or non-speech segments comprises:
   repeatedly performing processes of assigning the predetermined weight to a segment in which an energy level of a respective frame is changed and calculating weights for all respective segments; and
   identifying a segment corresponding to a minimum weight, among the calculated weights, as being a speech segment,
   wherein the segment corresponding to the minimum weight has a lower energy level than the other speech segments.

4. The method of claim 2, wherein, in the classifying of the frames, frames are classified according to calculated energies of respective frames.

5. The method of claim 2, further comprising modifying a classified energy level of a frame by changing the classified energy level of the frame,
   wherein in the detecting the energy changes, a segment in which the classified energy level of the frame is changed is identified.

6. The method of claim 5, wherein the energy change includes a change between energy levels of neighboring frames and a change between an initial energy level of a frame and a changed energy level of the frame.

7. The method of claim 2, further comprising updating the predetermined criteria according to detected energies of the signal.

8. The method of claim 7, wherein frames are classified into three levels including high, medium, and low levels based on the detected energies.

9. The method of claim 1, further comprising combining the identified speech segments with other speech and/or non-speech segments of the signal.

10. The method of claim 1, wherein the non-speech segments include a burst noise which has a frequency characteristic that remarkably changes within a short period of time compared to the whole time length of the signal.

11. At least one non-transitory recording medium comprising computer readable code to control at least one processing element to implement a speech recognition method, comprising:
   detecting, using at least one processing device, energy changes between a plurality of frames distinguishing portions of a signal, each of the plurality of frames having time lengths less than a whole time length of the signal; and
   identifying speech segments and/or non-speech segments from the plurality of frames based on the detected energy changes between the plurality of frames by assigning a predetermined weight to a segment in which an energy level of a respective frame is changed and when an energy difference exists between two neighboring frames.

12. A speech recognition system including at least one processing device, the system comprising:
   a change detector to detect, using the at least one processing device, energy changes between a plurality of frames distinguishing portions of a signal, each of the plurality of frames having lengths less than a whole time length of the signal; and
   a determiner to identify speech segments and/or non-speech segments from the plurality of frames based on the detected energy changes between the plurality of frames by assigning a predetermined weight to a segment in which an energy level of a respective frame is changed and when an energy difference exists between two neighboring frames.

13. The system of claim 12, further comprising
   an energy level classifier to classify each of the plurality of frames according to respective energy levels based on predetermined criteria,
   wherein the change detector detects a segment in which respective energies of each frame are changed based on the classified energy level.

14. The system of claim 13, further comprising:
   an energy calculator to calculate energies of each frame;
   an energy level updater to update the predetermined criteria according to the energies of each signal;
   wherein the energy level classifier classifies frames into three levels including high, medium, and low levels.

15. The system of claim 13, further comprising a generator to modify an energy level of a frame by changing the classified energy level of the frame,
   wherein the change detector detects a segment in which the classified energy level of the frame is changed.

16. The system of claim 12, wherein the determiner repeatedly performs processes of assigning the predetermined weight to a segment in which an energy level of a respective frame is changed and calculating weights for all respective segments in order to identify a segment corresponding to a minimum weight, among the calculated weights, as being a speech segment,
   wherein the segment corresponding to the minimum weight has a lower energy level than the other speech segments.

17. The system of claim 12, further comprising a combiner to combine the identified speech segment with other speech and/or non-speech segments of the signal.

18. A speech recognition system, comprising:
   an A/D converter to convert an analog input signal including speech and/or non-speech signals transmitted through an audio transducer into a digital input signal;
   a frame generator to generate a plurality of frames corresponding to the digital input signal;
   a phoneme detector to generate a phoneme sequence from the frames;
   a vocabulary recognition device to extract a phoneme sequence most similar to the phoneme detector generated phoneme sequence from a dictionary that stores reference phoneme sequences;
   a speech segment detection device including a determiner to detect energy changes between the frames distinguishing portions of the signal, each of the frames having time lengths less than a whole time length of the signal, and to identify a speech segment from the frames based on the detected energy changes between the frames by assigning a predetermined weight to a segment in which an energy level of a respective frame is changed and when an energy difference exists between two neighboring frames; and
   a phoneme sequence editor to edit the phoneme detector generated phoneme sequence based on information on speech segments provided from the speech segment detection device.

19. The system of claim 18, wherein the speech segment detection device combines identified speech segments with other speech and/or non-speech segments and outputs a result of the combination to the phoneme sequence editor.

20. The system of claim 18, wherein the phoneme sequence editor removes phoneme sequences, except phoneme sequences corresponding to speech segments, based on information on the identified speech segment.

* * * * *